May 16, 1950     R. F. BEAUDOIN     2,507,879
AUTOMOBILE HYDRAULIC JACK SYSTEM
Filed June 10, 1947     2 Sheets-Sheet 1
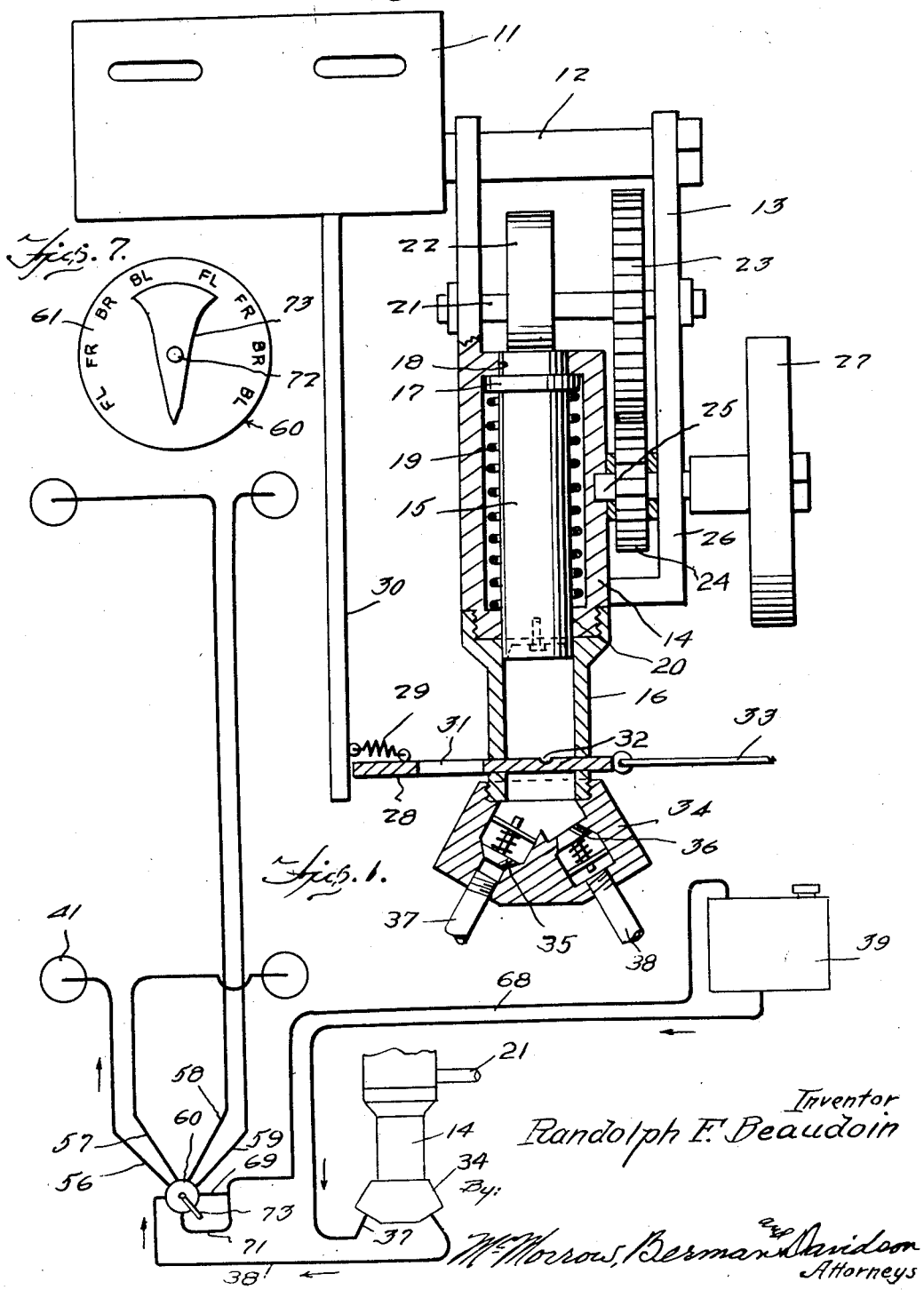
Inventor
Randolph F. Beaudoin
By McMorrow, Berman & Davidson
Attorneys

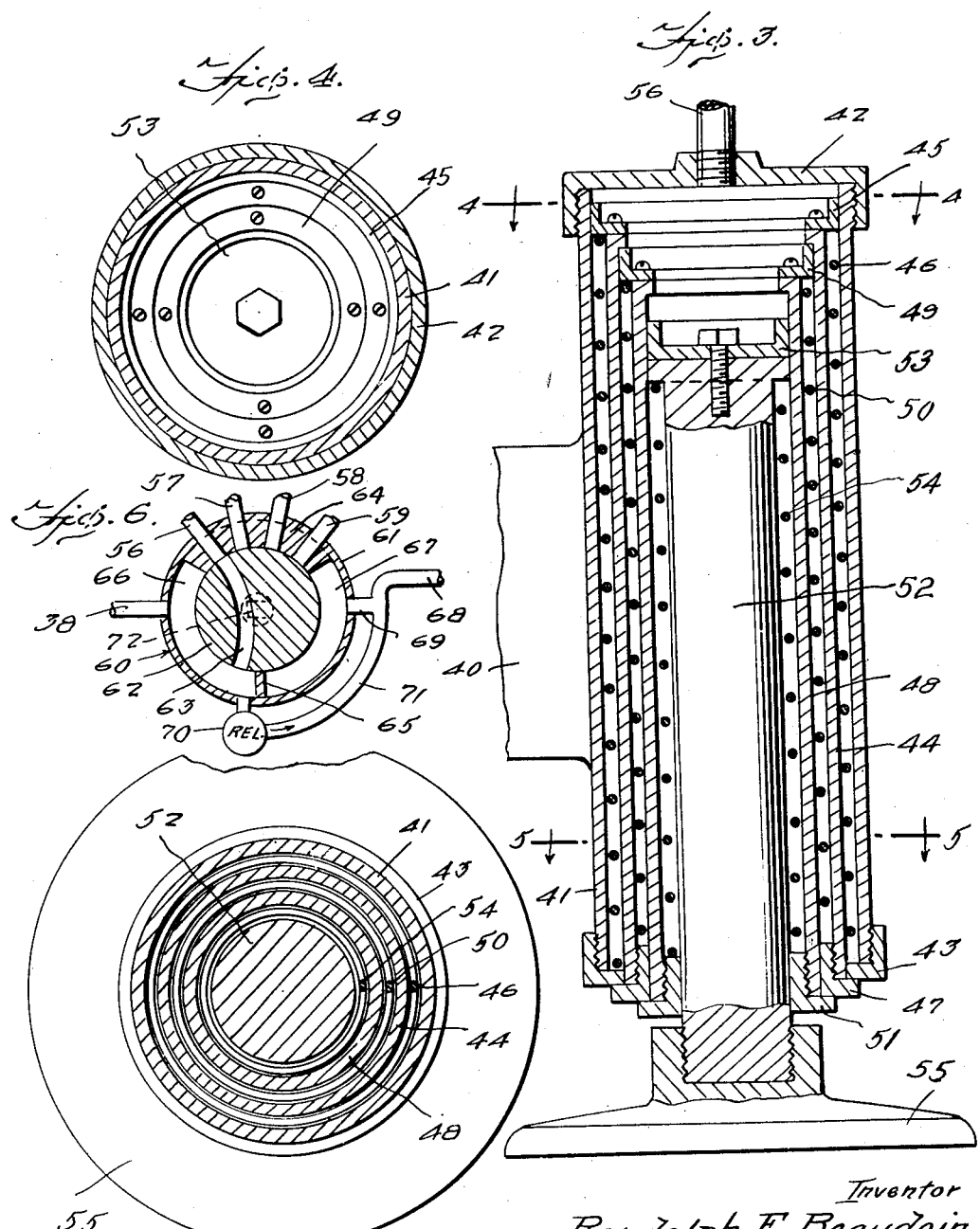

Patented May 16, 1950

2,507,879

UNITED STATES PATENT OFFICE 2,507,879

AUTOMOBILE HYDRAULIC JACK SYSTEM

Randolph F. Beaudoin, Sanford, Maine

Application June 10, 1947, Serial No. 753,698

1 Claim. (Cl. 103—54)

This invention relates to automobile lift devices, and more particularly to a hydraulic jack system which is carried by the automobile and which may be controlled by the operator thereof to raise any wheel off the ground for replacing a tire or for making other required repairs to the automobile.

A main object of the invention is to provide a novel and improved automobile jack system which is very simple in construction, easy to operate and reliable in performance.

A further object of the invention is to provide an improved automobile jack structure which is carried by the automobile and which is actuated by the engine of the automobile, the structure providing means for lifting any selected wheel of the automobile, for changing a tire or for performing other repairs, and being controlled by the operator of the automobile from a control device which may be located on the automobile dashboard or other suitable location, the system being relatively inexpensive to install and being very efficient in operation.

Further objects and advantages of the invention will become apparent from the following description and claim, and from the accompanying drawings, wherein:

Figure 1 is a schematic diagram of a hydraulic automobile wheel jack system constructed in accordance with the present invention.

Figure 2 is a vertical cross-sectional view taken through a pump device employed in the jack system of Figure 1.

Figure 3 is a vertical cross-sectional view taken through a jack cylinder employed in the system of Figure 1.

Figure 4 is a cross-sectional view taken on line 4—4 of Figure 3.

Figure 5 is an enlarged cross-sectional view taken on line 5—5 of Figure 3.

Figure 6 is an enlarged cross-sectional detail view taken through the selector valve employed in the jack system of Figure 1.

Figure 7 is a front view of the selector valve dial forming a part of the selector valve of Figure 6.

Referring to the drawings, 11 designates a supporting bracket member which is bolted to the cylinder head or block of the automobile engine at a location adjacent the fan belt thereof. Secured to bracket 11 is a stud member 12 to which is pivotally secured a depending frame 13. Frame 13 includes an integral cylinder portion 14 containing a piston 15. Threaded to the lower end of cylinder 14 is a sleeve member 16 in which the lower end of piston 15 reciprocates. The upper portion of piston 15 carries a collar 17, the top end of the piston projecting through a bore 18 formed in the top wall of cylinder 14. A coiled spring 19 encircles the piston 15 and bears between collar 17 and the bottom annular portion of the cylinder, shown at 20, to thereby bias piston 15 upwardly.

Journalled transversely in frame 13 above cylinder 14 is a shaft 21 which carries an eccentric 22 bearing on the top end of piston 15. Shaft 21 also carries a gear 23 which is in mesh with a gear 24 carried on a shaft 25 journalled between cylinder 14 and the adjacent vertical frame member 26 and extending through said frame member. Secured to the outer end of shaft 25 is a friction disc 27 which is in engagement with the flat side of the automobile fan belt, not shown. Transversely slidable through the lower portion of sleeve 16 is a valve plate 28 connected by a spring 29 to a depending arm 30 carried by bracket member 11, whereby valve plate 28 is biased toward an abutting position with respect to said arm. Valve plate 28 is formed with a valve opening 31, normally out of registry with the internal bore of sleeve 16, as shown in Figure 2. Said plate is also formed with a vent groove 32 which connects the interior of sleeve 16 with atmosphere when the valve plate is in the normal position thereof, shown in Figure 2. A flexible cable 33 is connected to the end of valve plate 28, said cable being connected at its other end to a suitable manually operated pull rod mounted on the vehicle dashboard. When the pull rod is actuated, cable 33 moves valve plate 28 to a position wherein opening 31 is in registry with the internal bore of sleeve 16, whereby the pump can supply fluid to the selected lifting jack.

Secured to the lower end of sleeve 16 is a valve head 34 containing a first inwardly-opening check valve 35 and a second outwardly-opening check valve 36. When vacuum is developed in sleeve 16 responsive to the upward movement of piston 15, check valve 35 is adapted to open, check valve 36 remaining closed. When compression is developed in sleeve 16 due to the downward movement of piston 15, check valve 36 opens and check valve 35 is held closed. An intake conduit 37 is connected to valve head 34 at check valve 35 and an outlet conduit 38 is connected to said valve head at check valve 36. Conduit 37 is connected to the bottom of an oil reservoir 39 mounted on the vehicle at an elevated position with respect to the pump cylinder 14.

Secured to the under portion of the frame 40 of the vehicle adjacent each wheel thereof is a vertical cylinder 41 having a top cap 42 and having threaded to its bottom end an annular bushing 43. Telescoped inside cylinder 41 is a second cylinder 44 having an annular top piston portion 45. Encircling cylinder 44 and bearing between bushing 43 and piston portion 45 is a coiled spring 46. Threaded into the bottom end of cylinder 44 is an externally flanged annular bushing 47 which abuts outer bushing 43 under the expansive force of spring 46. Telescoped inside cylinder 44 is a third cylinder 48 having an annular top piston portion 49. Encircling cylinder 48 and bearing between bushing 47 and piston portion 49 is a coiled spring 50. Threaded into the lower end of cylinder 48 is an externally flanged bushing 51 which abuts bushing 47 under the expansive upward force exerted on cylinder 48 by spring 50. Telescoped inside cylinder 48 is a rod 52 having a top piston portion 53. Encircling rod 52 and bearing between bushing 51 and piston portion 53 is a coiled spring 54. Secured to the bottom end of rod 52 is a ground-engaging shoe 55. Connected to the top cap 42 is a conduit 56. The springs 46, 50 and 54 normally maintain shoe 55 in a raised position. When fluid under pressure is admitted through conduit 56 at top cap 42, said fluid acts on piston 53, causing the rod 52, cylinder 48 and cylinder 44 to move downwardly against the pressure of said springs, and to bring shoe 55 into ground engagement, whereby the vehicle is jacked up at said point. When the fluid pressure is relaxed, springs 46, 50 and 54 retract the shoe 55 and the telescoping sleeve elements 48 and 44 upwardly in sleeve 41 and force the fluid back through conduit 56, restoring the parts of the jack to their normal raised positions.

The conduits to the respective wheel jacks are respectively shown at 56, 57, 58 and 59. The entry of fluid to and the discharge of fluid from said conduits is controlled by a selector valve 60 mounted on the vehicle dashboard. Valve 60 comprises a cylindrical housing 61 in which is rotatably axially mounted a cylindrical core member 62 formed with an arcuate passage 63. Secured in housing 61 is an arcuate port block 64 formed with respective ports to which the conduits 56, 57, 58 and 59 are connected. Opposite port block 64 is a partition wall 65 defining on one side thereof a fluid intake space 66 and on the other side thereof a fluid discharge space 67. Connecting discharge space 67 to an exhaust conduit 68 is a conduit 69, exhaust conduit 68 being connected to the fluid storage tank 39. Fluid intake space 66 is connected through a relief valve 70 to a conduit 71 which also connects to exhaust conduit 68.

Core member 62 has an operating shaft 72 carrying at its outer end a pointer handle 73. The face of housing 61 is indexed so that pointer handle 73 may be positioned in accordance with a desired operating position of the valve 60.

In operation, cable 33 is pulled by its pull rod to a position wherein the opening 31 in valve plate 28 is placed in registry with the internal bore of sleeve 16. The pump is placed in operation, and oil is drawn from tank 39 into the pump through valve 35 and is forced under pressure through valve 36 to conduit 38. Pointer handle 73 is rotated to indicate the desired jack to be operated, which causes the arcuate passage 63 of core 62 to register at one end with the port opening to which is connected the conduit 56, 57, 58 or 59 leading to the selected jack. The other end of passage 63 is in communication with intake space 66, as shown in Figure 6, and oil under pressure then flows to the selected jack, causing extension thereof. When the repair operation is completed, cable 33 is released and pointer handle 73 is rotated to a position wherein the conduit 56, 57, 58 or 59, of the selected jack is placed in communication by passage 63 with the discharge space 67 of the valve, thereby allowing the jack springs to force the oil back through conduits 68 and 69 to the storage tank 39.

In order to prevent unintended operation of jacks other than the one selected, it is preferable to first set the handle pointer 73 in the correct position for operation of the desired jack and then to actuate the pull rod for the cable 33.

While a specific embodiment of a hydraulic jack system carried by and operated by the motor of a motor vehicle has been disclosed in the foregoing description, it will be understood that various modifications within the spirit of the invention may occur to those skilled in the art. Therefore, it is intended that no limitations be placed on the invention other than as defined by the scope of the appended claim.

What is claimed is:

A pump device for use with a hydraulic jack system for automobiles, comprising a bracket constructed and arranged to be mounted upon the automobile engine near the fan belt thereof and including a longitudinally extending stud, a depending substantially U-shaped frame pivotally mounted upon the stud, a substantially vertical cylinder secured to the lower end of the U-shaped frame near one side thereof and having aligned top and bottom openings forming top and bottom annular shoulders, a piston arranged within the cylinder and extending into the top and bottom openings and having a collar near its top to engage the top shoulder, a coil spring arranged within the cylinder and surrounding the piston and engaging the bottom shoulder and collar to bias the piston upwardly, a shaft journalled upon the U-shaped frame above the cylinder, an eccentric mounted upon the shaft for rotation therewith and engaging the top of the piston for reciprocating the same, a gear mounted upon the shaft within the frame, a second shaft journaled upon the frame below the first shaft, a second gear mounted upon the second shaft and meshing with the first gear to drive the same, a friction wheel mounted upon the second shaft outwardly of the frame and constructed and arranged to be driven by the fan belt, a depending tubular sleeve secured to the bottom end of the cylinder and having a bore receiving the piston and a transverse slot, a flat valve plate slidably mounted within the slot and provided with a port to register with the bore of the sleeve, a depending arm secured to the bracket a retractile spring connecting the arm and valve plate to maintain the port out of registration with the bore of the sleeve, a flexible element connected with the opposite side of the valve plate and operable from within the automobile to move the port into registration with the bore, a valve head secured to the bottom end of the sleeve, and inlet and outlet check valves mounted upon the head and communicating with the bore of the sleeve.

RANDOLPH F. BEAUDOIN.

REFERENCES CITED

The following references are of record in the file of this patent:

UNITED STATES PATENTS

| Number | Name | Date |
| --- | --- | --- |
| 1,161,706 | Lohmiller et al. | Nov. 23, 1915 |
| 1,368,688 | Bowman | Feb. 15, 1921 |
| 1,548,182 | Burgin | Aug. 4, 1925 |
| 1,564,120 | Beckwith | Dec. 1, 1925 |
| 1,711,565 | Hatfield | May 7, 1929 |
| 2,056,954 | Bryant | Oct. 13, 1936 |